(12) United States Patent
Alimadad (10) Patent No.: US 10,790,670 B1
(45) Date of Patent: Sep. 29, 2020

(54) HYBRID GENERATOR SYSTEM AND METHOD WITH MULTI TASKED POWER INVERTER

(71) Applicant: ZEROBASE ENERGY, LLC, Fremont, CA (US)

(72) Inventor: Mohammadmehdi Alimadad, Fremont, CA (US)

(73) Assignee: Zerobase Energy, LLC, Fremont, CA (US)

(*) Notice: Subject to any disclaimer, the term of this patent is extended or adjusted under 35 U.S.C. 154(b) by 132 days.

(21) Appl. No.: 15/915,500

(22) Filed: Mar. 8, 2018

(51) Int. Cl.
| | |
|---|---|
| H02J 4/00 | (2006.01) |
| H02J 9/00 | (2006.01) |
| H02M 5/45 | (2006.01) |
| H02J 3/38 | (2006.01) |
| H02J 9/06 | (2006.01) |
| H02J 7/02 | (2016.01) |
| H02M 5/458 | (2006.01) |

(52) U.S. Cl.
CPC ............. *H02J 3/381* (2013.01); *H02J 7/022* (2013.01); *H02J 9/062* (2013.01); *H02M 5/458* (2013.01)

(58) Field of Classification Search
CPC ........... H02J 9/062; H02J 3/381; H02J 7/022; H02M 5/458
See application file for complete search history.

(56) References Cited

U.S. PATENT DOCUMENTS

| | | | |
|---|---|---|---|
| 7,279,801 B2* | 10/2007 | Kagoshima | .............. B60K 6/46 290/400 |
| 7,432,615 B2 | 10/2008 | Hjort | |
| 7,701,087 B2 | 4/2010 | Eckroad et al. | |
| 7,939,968 B2 | 5/2011 | Hjort et al. | |
| 7,948,118 B2 | 5/2011 | Chambon | |
| 8,291,587 B2 | 10/2012 | St. Mary | |
| 2004/0084965 A1 | 5/2004 | Welches et al. | |
| 2004/0135544 A1* | 7/2004 | King | ....................... B60L 58/22 320/116 |
| 2005/0141248 A1 | 6/2005 | Mazumder et al. | |
| 2007/0212596 A1* | 9/2007 | Nebrigic | ............... H01M 10/42 429/61 |
| 2011/0215641 A1* | 9/2011 | Peterson | ................ H01H 11/00 307/23 |
| 2013/0076152 A1 | 3/2013 | Nielsen | |
| 2013/0214602 A1 | 8/2013 | Frohman et al. | |

(Continued)

*Primary Examiner* — Alfonso Perez Borroto
*Assistant Examiner* — Esayas G Yeshaw
(74) *Attorney, Agent, or Firm* — Patterson Intellectual Property Law, P.C.; Gary L. Montle (57) ABSTRACT

A hybrid power system integrates with or supplements an existing diesel-powered generator set including a frequency converter with an input rectifier and an output inverter. A bidirectional DC-DC power converter and a battery are coupled to a DC bus between the rectifier and inverter. A controller receives sensor inputs associated with inverter output power to a load and a charge state of the battery. The controller is configured, upon determining a first charge state of the battery, to disable DC power from the rectifier to the DC bus, and to enable discharge of energy stored on the battery to the inverter via the DC bus. The controller is further configured, upon determining a second charge state of the battery, to reestablish DC power from the rectifier to the DC bus, and to direct energy from the DC bus for energy storage on the battery via the DC-DC power converter.

20 Claims, 6 Drawing Sheets

(56) References Cited

U.S. PATENT DOCUMENTS

| | | |
|---|---|---|
| 2014/0277791 A1 | 9/2014 | Lenard et al. |
| 2017/0346262 A1* | 11/2017 | Sekine ................ H02M 7/5387 |
| 2018/0244407 A1* | 8/2018 | Rozman ................ B64G 1/428 |
| 2018/0287392 A1* | 10/2018 | Maedako .................. H02J 3/46 |
| 2019/0181677 A1* | 6/2019 | Toyoda ..................... H02J 7/34 |

* cited by examiner

HYBRID GENERATOR SYSTEM AND METHOD WITH MULTI TASKED POWER INVERTER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to diesel generators and systems for producing output power to a load therefrom. More particularly, the present invention relates to a repurposed generator frequency converter (AC to AC converter) as a multi tasked hybrid converter which can selectively convert either of a diesel generator 300 Hz AC output and a stored auxiliary DC voltage to a 60 Hz AC output.

Portable electrical generators are well known for the purpose of supplying power, for example back-up power in the event of an outage, or even as a primary source of power in rural or otherwise undeveloped areas. One conventional example of such a generator is a 3 kW tactical quiet generator (TQG) set. The TQG is a self-contained, skid mounted, portable generator set that has been deployed extensively by the U.S. military, with an estimated 25,000 units deployed around the world. The generator set typically comprises a functionally transportable housing including a fuel powered engine assembly, a permanent magnet AC generator, a control box assembly, an output/load panel, primary and auxiliary fuel systems, an enclosure cooling and ventilation system, an engine exhaust assembly, and a 24 VDC battery. The generator set is designed to be used with any equipment requiring a small source of 120V/240V 60 Hz AC power and operates in a "Hot and Basic" climatic condition range of −25° F. to +120° F.

Figure 1:
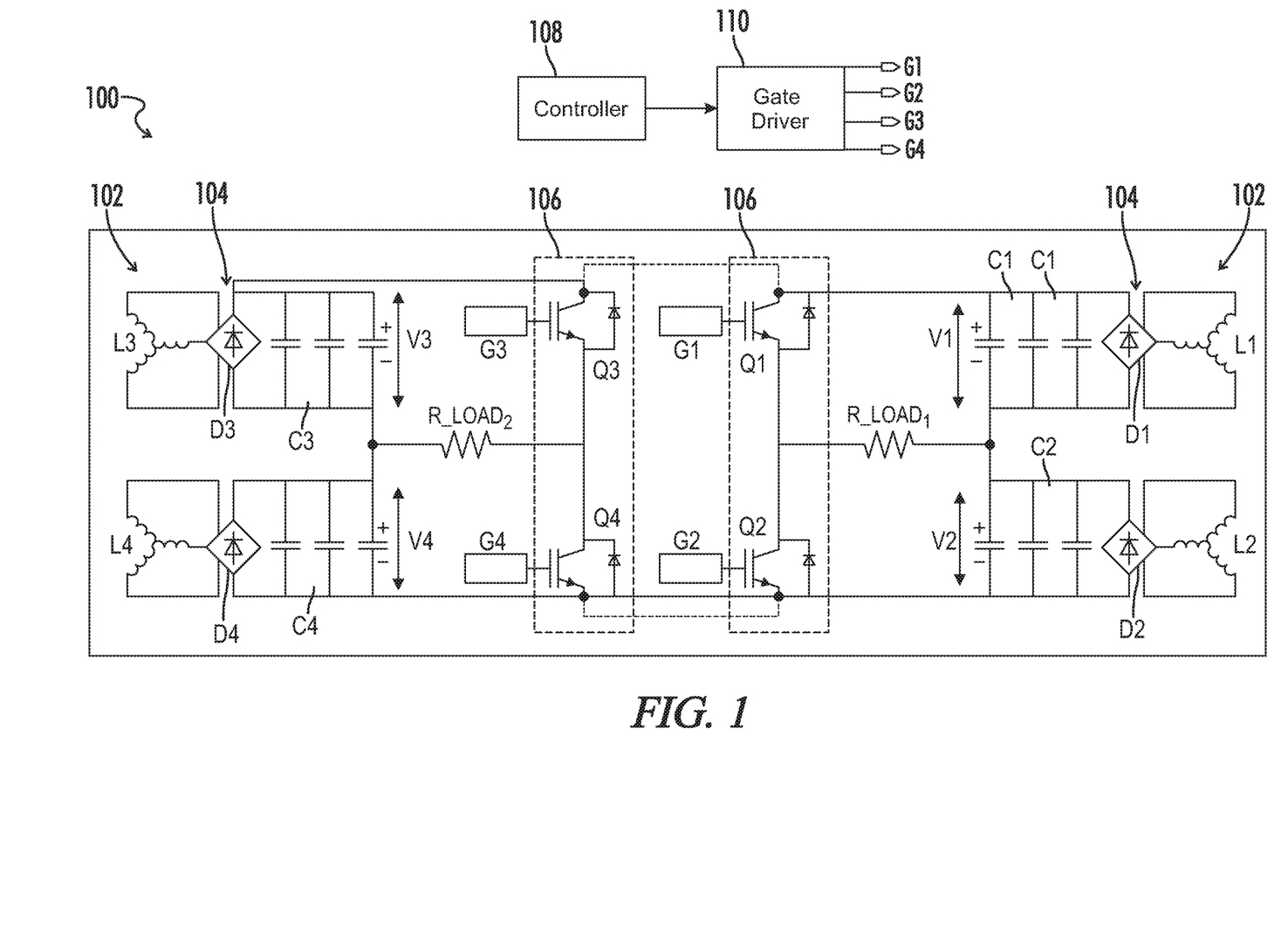
FIG. 1 is a circuit diagram representing a diesel-powered generator set as conventionally known in the art.

With further reference to FIG. 1, an exemplary TQG 100 as known in the art further includes power electronics which convert the high frequency generator output to a 60 Hz 120 VAC output. The TQG uses a permanent magnet alternator (PMA) with a frequency converter which may be located in the skid base between the control box and generator. Generator windings 102 (e.g., four pole PMA L1-L4) deliver three-phase AC electrical power to a rectifier circuit 104 (D1-D4) which converts the AC input power to DC power disposed on a DC bus. The rectifier circuit 104 may be formed of three-phase rectifier bridges including fast recovery diodes. A split phase inverter 106 is further coupled to the DC bus and configured via a first voltage leg (including first and second switching elements Q1, Q2) and a second voltage leg (including third and fourth switching elements Q3, Q4) to produce the 60 Hz 120 VAC output to one or more power receptacles, via which a load is coupled to receive the power output.

The switching elements are operated via driving signals G1-G4 from a conventional gate drive circuit 110, which itself receives control signals from a device controller 108 that is configured to regulate the output of the frequency converter based at least in part on operation of the switching elements. Voltage regulation is maintained within one percent, throughout specified voltage ranges, from no load to rated load. An output control signal from the converter is connected to the controller to vary engine speed, depending on demand or load condition. This enables the generator set to operate at lower engine speeds for light-load conditions while maintaining the required output voltage.

The TQG is a variable speed generator that is configured to run at a minimum speed of around 3000 RPM regardless of the electrical load, and consumes about 0.33 gallons of fuel per hour. Accordingly, it would be desirable to address a number of important operational and reliability issues in the conventional generator sets.

For example, the TQG produces inefficient fuel consumption while operating with a low power load.

Further, a condition known as "wet stacking" occurs when the diesel engine runs below its designed operating temperature for extended periods, such as may be due to operating at a low power load. Unburned fuel is exhausted from the combustion chamber, resulting a buildup of carbon on the exhaust valves, and unburned fuel escaping past the piston rings and into the oil pan. Continued "wet stacking" results in premature engine wear and ultimate failure.

The cost and risk of fuel delivery is another problem for conventional applications. Generator sets are critical to generate electricity and/or maintain power grids in field operations, but they require consistent delivery of fuel. When power is lost due to limited fuel supplies and maintenance, field operations are accordingly at risk.

BRIEF SUMMARY

Various embodiments of a hybrid power system and method are described herein, which allow for a seamless and efficient transfer between a diesel-powered generator and an auxiliary battery, making the hybrid system behave as analogous to an in-line uninterruptable power supply (UPS).

In an exemplary embodiment, a power system as disclosed herein includes a rectifier which converts three-phase AC power from a diesel-powered generator to convert to DC power. An inverter is coupled to the DC bus and generates an AC output to a load. A DC-DC power converter is coupled on a first end to the DC bus, and on a second end to an energy storage device which is configured to store and discharge energy via the DC-DC power converter and the DC bus. A controller is operably connected to one or more sensor inputs associated with the output power to the load and a charge state of the energy storage device. Sensors may include, e.g., current transformers, resistor networks or the like connected to one or more nodes proximate the desired source. The controller is configured, upon determining a first charge state of the energy storage device, to disable the DC power from the rectifier to the DC bus and to enable discharge of energy stored on the energy storage device to the inverter via the DC bus. The controller is further configured, upon determining a second charge state of the energy storage device, to reestablish DC power from the rectifier to the DC bus and to direct energy from the DC bus for energy storage on the energy storage device via the DC-DC power converter.

In one exemplary aspect of the aforementioned embodiment, the DC-DC power converter may be formed of first and second bidirectional and isolated DC-DC power converters, coupled on their respective first ends to the DC bus and to each other, and further coupled on their respective second ends across the energy storage device.

In another exemplary aspect of the aforementioned embodiment, the energy storage device comprises an electrochemical battery, such as for example a lithium ion phosphate battery.

In another exemplary aspect of the aforementioned embodiment, the inverter comprises a split phase configuration with a first leg comprising first and second switching elements coupled in series and a second leg comprising third and fourth switching elements coupled in series. The load is coupled to a node between the first and second switching elements and to a node between the third and fourth switching elements. The first end of the first DC-DC converter comprises a negative terminal coupled to the second and fourth switching elements, and the first end of the second DC-DC converter comprises a positive terminal coupled to the first and third switching elements, wherein a positive terminal on the first end of the first DC-DC converter and a negative terminal on the first end of the second DC-DC converter are further coupled to each other and to a neutral line.

In another exemplary aspect of the aforementioned embodiment, the first charge state comprises a stored energy value above a first threshold (e.g., associated with a fully charged device), and the second charge state comprises a stored energy value below a second threshold (e.g., associated with a substantially discharged device).

In another exemplary aspect of the aforementioned embodiment, the controller is configured to determine demand, or a target output power to the load, and to calculate a surplus power available for charging of the energy storage device based at least in part thereon. The system controller prioritizes the production of output power to the load, so the generator will always work at full load and efficiency.

In another exemplary aspect of the aforementioned embodiment, the controller is configured to disable the DC power from the rectifier to the DC bus by controlling the generator to be turned off.

Accordingly, with an embodiment of a hybrid power system and method as disclosed herein, the capacity to power an external load is not reduced. With the TQG portion of the system turned OFF, the auxiliary battery discharges via the existing inverter at 3 kW nominal power. When the battery is charging, the system can simultaneously charge the battery up to 2.4 kW and provide AC power to a load.

Furthermore, an embodiment of a hybrid power system and method as disclosed herein provides fail-safe operation, because a possible failure of the auxiliary circuit branch (e.g., including the DC-DC power conversion network and battery) does not interrupt power output to an external load as provided by the TQG.

There are currently more than 25,000 3 kW TQG's that have been fielded by the U.S. military. Embodiments of a power system as disclosed herein may integrate with or otherwise supplement existing TQG sets to provide potential advantages including, but not limited to, fuel savings, run time reduction, emissions reduction, reliability improvements and silent watch capability.

DETAILED DESCRIPTION

Referring generally to FIGS. 2-6, various exemplary embodiments of an invention may now be described in detail. Where the various figures may describe embodiments sharing various common elements and features with other embodiments, similar elements and features are given the same reference numerals and redundant description thereof may be omitted below.

Figure 2:
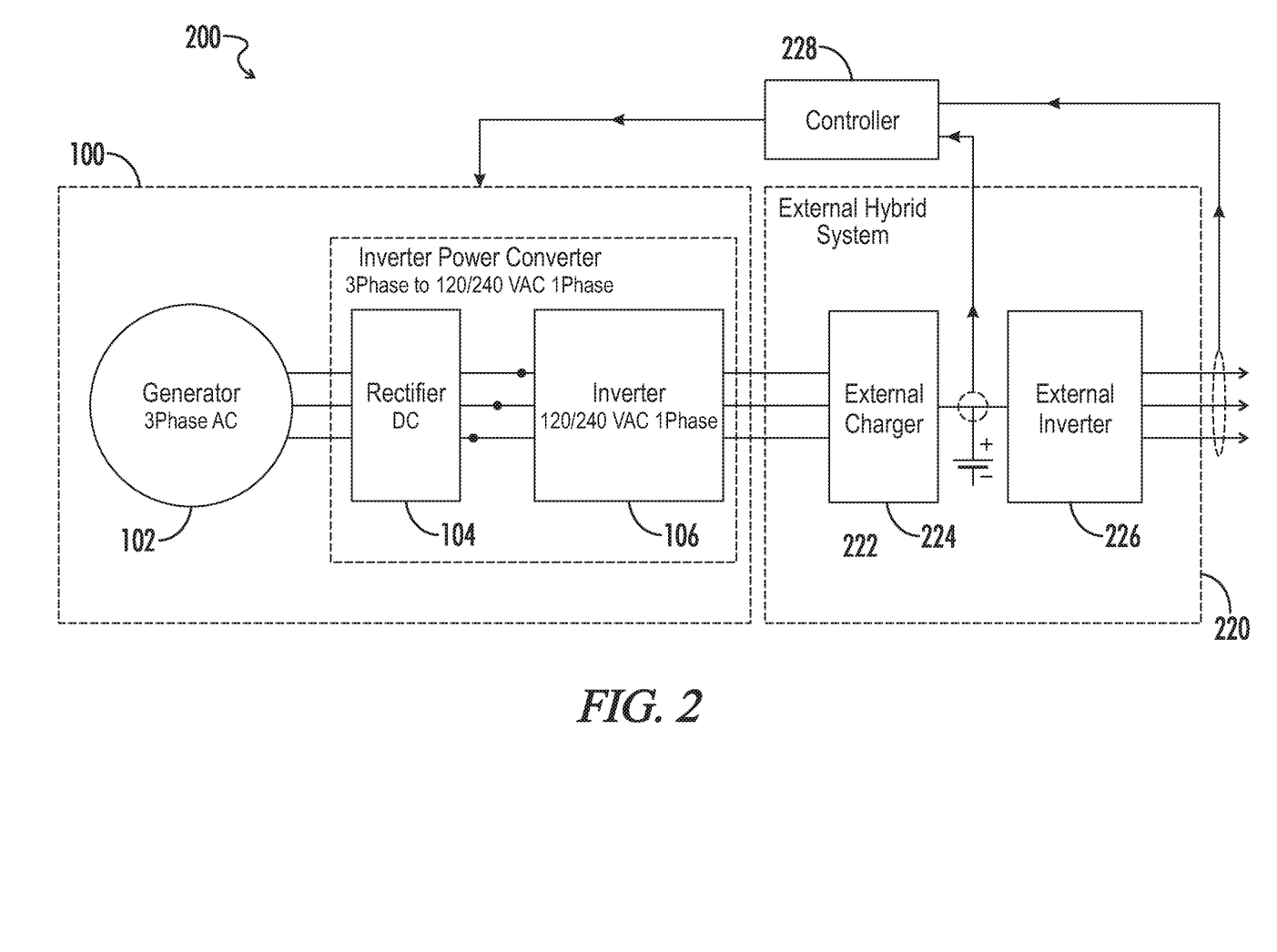
FIG. 2 is a circuit block diagram representing an exemplary hybrid power system to integrate with the generator set of FIG. 1.
Figure 3:
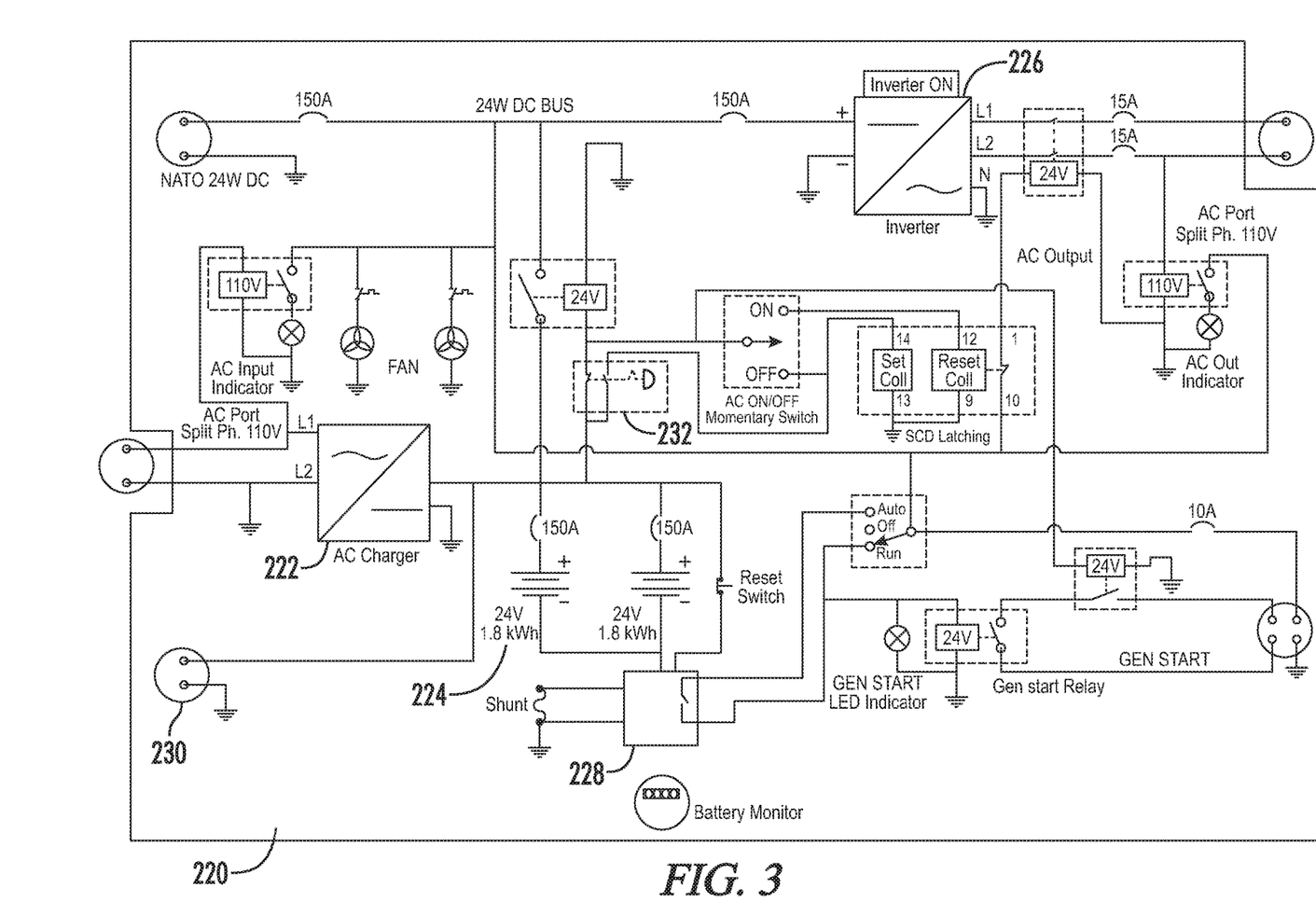
FIG. 3 is a circuit diagram representing an embodiment of the hybrid power system of FIG. 2.

Referring first to FIGS. 2 and 3, an initial embodiment of a power system 200 as disclosed herein includes an external hybrid system 220 coupled to the inverter generator 100 of for example a TQG as previously described. The external hybrid system 220 provides an external AC/DC converter 222 which is coupled to receive the 120/240 split phase AC output from the inverter 106, an energy storage device 224, and an external DC/AC inverter 226 which is connected to the load. The converter 222, battery 224, and inverter 226 share a common DC bus.

The hybrid power system 220 takes the 120V/60 Hz output of the frequency converter 106 and converts it to 24 VDC power to charge the energy storage device, which may be for example an electrochemical battery 224. Although one of skill in the art may appreciate various types of an electrochemical battery can be used, a lithium ion phosphate battery may preferably be implemented to keep the hybrid power system relatively light and compact. Energy storage capability may be supplemented, as in the example shown in FIG. 3, by connecting an auxiliary battery port 230. In an embodiment, the hybrid power system 220 can be bypassed for standard operation of the frequency converter. An emergency stop button 232 may further be provided for immediate disconnection of loads.

In a practical implementation of the described embodiment, the External Charger has a maximum efficiency of about 95%.

A controller 228 senses a battery charge state, and when the battery 224 is determined to be fully charged (or above an associated first threshold charge value), the controller is configured to command the TQG 100 to turn off, wherein the battery is discharged to the load via a 120V/60 Hz pure-sine wave inverter 226. In the practical implementation of the described embodiment, the inverter has a maximum efficiency of about 90%.

The controller 228 continues to sense the battery charge state, and when the battery 224 is determined to have reached a low state of charge (e.g., below a second threshold charge value), the controller 228 turns the generator 102 on, and the TQG 100 provides power to the load while recharging the battery 224 to a full state of charge. In the practical implementation of the described embodiment, the battery round trip efficiency is about 77%.

The process repeats by cycle charging the battery 224, providing a hybrid power system 220 that saves generator fuel, reduces generator run time and engine noise, and extends the life of the generator 102.

However, although the aforementioned embodiment of a hybrid power system 200 provides fuel savings and quiet operation, it introduces additional losses to the collective system due to the double conversion and the electrochemical storage. The generator power is first converted from AC to DC and from DC to AC in the TQG frequency converter. The power is then converted again from AC to DC and from DC to AC in the hybrid converter/inverter 220. An additional loss (of, e.g., about 15%) is introduced in the dual conversion process. For example, whereas the output power rating of the TQG frequency converter is a continuous 3 kW, the output power rating of the overall system is reduced via the dual conversion process by 15%, to a 2.55 kW rating.

Furthermore, when charging the battery 224, the TQG output capacity to power an external load is further reduced by the inefficiency of the charger 222 and the battery 224. Accordingly, the maximum load capacity of the TQG 100 when charging the battery 224 may be about 1.7 kW.

Figure 4:
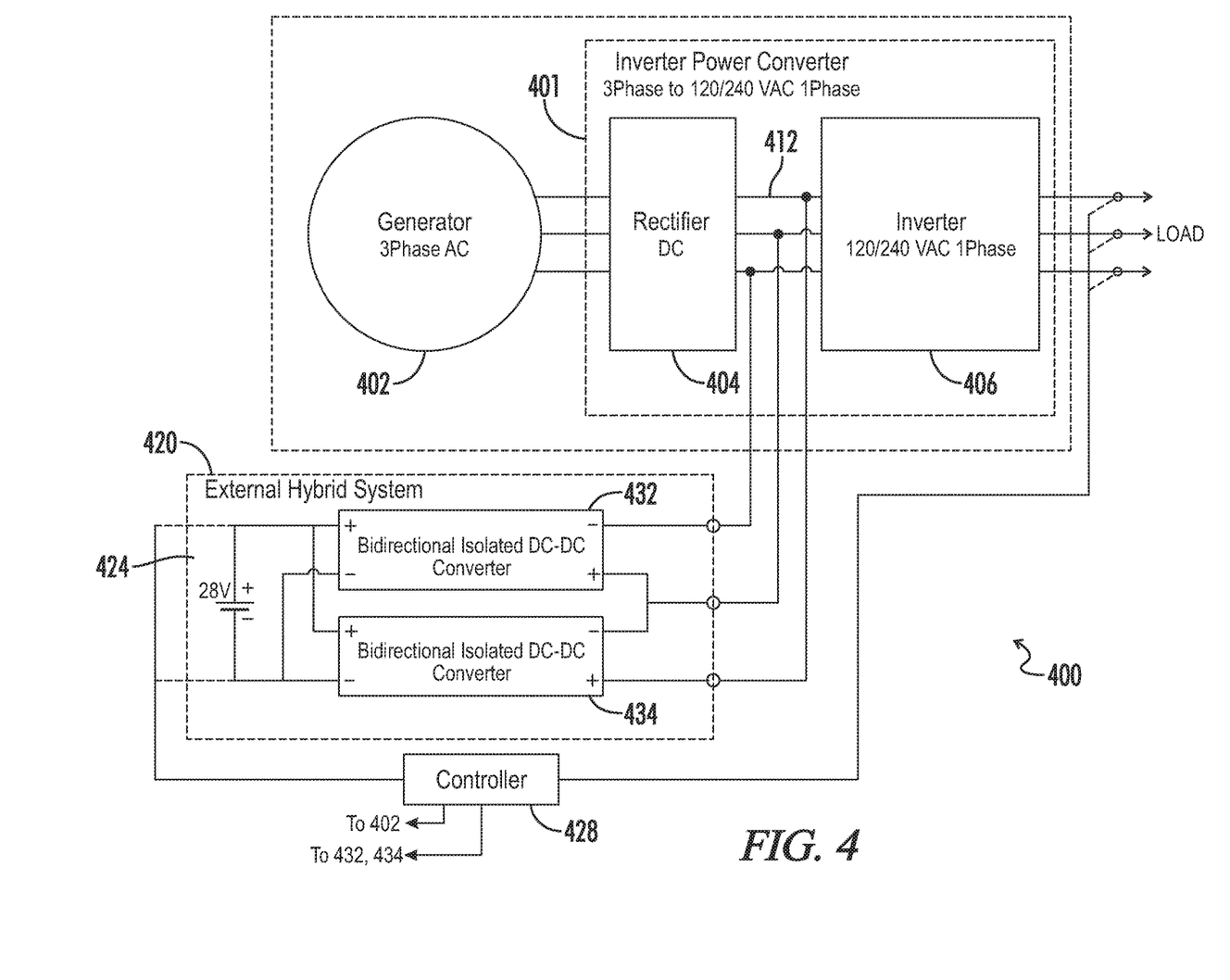
FIG. 4 is a circuit block diagram representing another embodiment of a hybrid power system as disclosed herein.
Figure 5:
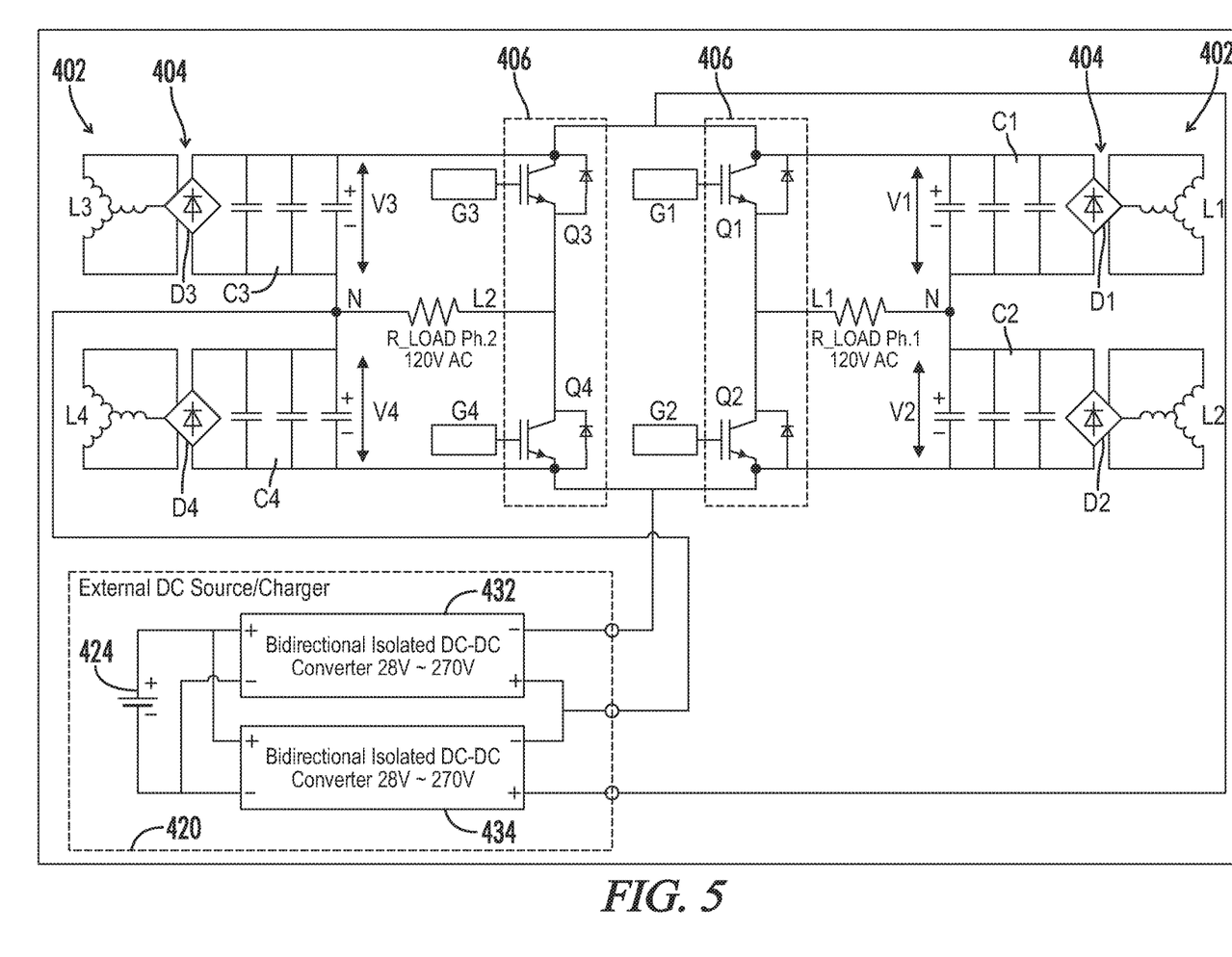
FIG. 5 is a circuit diagram representing exemplary detail for the hybrid power system of FIG. 4.

Referring now to FIGS. 4 and 5, a preferred embodiment of a hybrid power system 400 is disclosed herein to overcome the above-referenced shortcomings of the power system 200. The inefficient dual power conversion described above is removed by providing a repurposed inverter 406 in a modified TQG frequency converter 401, which no longer requires a separate inverter in a parallel hybrid branch 420 of the system. The external hybrid system 420 is introduced with an energy storage device 424 (e.g., an electrochemical battery) and a DC/DC charger 432 that connects to the DC bus 412 of the TQG frequency converter 401. With the TQG turned ON, the AC power from the generator 402 is converted to DC by the rectifier circuit 404 in the frequency converter 401 and used by the DC/DC converter 432 to charge the battery 424. Concurrently, the TQG frequency converter 401 provides power to the external load via the existing inverter 406. When the battery is determined to be fully charged, the controller 428 turns the diesel engine OFF, and power to the load is provided by the battery 424 via the same inverter 406.

In an embodiment as illustrated, two bi-directional isolated DC/DC converters 432, 434 are used to connect a low voltage battery 424, typically 24 VDC, to the high voltage DC bus 412 of the TQG frequency converter 401. A positive (+) terminal on the high-voltage end (illustrated on the right side in FIG. 5) for one of the DC-DC converters 434 is coupled to the collector terminals for each of high-side switching elements Q1, Q3 of the inverter 406. A negative (−) terminal on the high-voltage end for the other DC-DC converter 432 is coupled to the emitter terminals for each of low-side switching elements Q2, Q4 of the inverter 406. The negative terminal on the high-voltage end of the converter 434 and the positive terminal on the high-voltage end the converter 432 are coupled to each other and to the neutral line for the frequency converter 401. Positive terminals on the low-voltage end for both of the DC-DC converters 432, 434 are connected to the positive terminal of the battery 424, and negative terminals on the low-voltage end for both of the DC-DC converters 432, 434 are connected to the negative terminal of the battery 424. The bidirectional DC-DC converters 432, 434 are accordingly configured during a first mode of operation, wherein the battery is charging power provided from the generator 402, to step down a high-voltage input (e.g., about 280 VDC) from the DC bus 412 of the frequency converter 401 to a rated voltage for the battery (e.g., about 28 VDC). Likewise, the DC-DC converters 432, 434 are configured during a second mode of operation, wherein the battery is discharging power to the inverter 406 of the frequency converter 401, to step up a low-voltage input from the battery to the required high-voltage DC power for the frequency converter 401.

The aforementioned embodiment of a hybrid power system 400 as disclosed herein increases battery round trip efficiency by 4% by removing one conversion step and by introducing high efficiency DC/DC converters. The system hardware is further simplified by eliminating the external inverter 226, and allows for a seamless transfer between the generator 402 and battery 424, making the external (auxiliary) portion 420 of the system 400 behave as an in-line uninterruptable power supply (UPS).

With this embodiment of the system 400, the capacity to power an external load is also not reduced. With the TQG generator 402 turned OFF, the battery 424 discharges via the existing inverter 406 at 3 kW nominal power. When the battery 424 is charging, the system can simultaneously charge the battery 424 up to 2.4 kW and provide AC power to the load. The controller 428 may be programmed to always prioritize the provision of a target output power to the load over charging of the battery 424, such that it calculates how much extra power is available to charge the battery 424 while maintaining operation of the generator 402 at full load and efficiency. Accordingly, where the generator output at its most efficient operating settings substantially corresponds to a target power output to a load (i.e., demand), the controller will operate the system at maximum efficiency and without concern for charging of the battery. However, if the target power output to the load requires less than the available output from the inverter generator 401 when operating at its maximum efficiency, the controller 428 may calculate the difference and cause the battery 424 to be charged with the surplus energy, without otherwise requiring adjustment to the operation of the inverter generator 401. In an embodiment, the controller may be further configured to modify one or more threshold levels of charge on the energy storage device, so as to optimize the generator turn-on and turn-off (i.e., battery charge and discharge) modes of operation for overall efficiencies of one or more components of the power system.

The aforementioned embodiment of the system 400 also provides fail-safe operation, because a possible failure of the external (auxiliary) branch 420 does not interrupt power output to an external load as provided by the inverter generator 401. In an exemplary embodiment of the series-coupled hybrid power system 200, the transition may for example be made via a bypass switch (not shown).

In certain embodiments, an external hybrid power system 420 may be provided in modular form, having a separate housing with respect to the housing for an existing generator set 100 such as an exemplary TQG, but stacked, mounted or otherwise installed and electrically integrated therewith to define a power system 400 as disclosed herein. In other embodiments, the various power system 400 components may be fully integrated in a single housing. Accordingly, a first controller 428 may be provided with the external system 420 and connected to control circuitry associated with the TQG set for implementation of generator turn-on/turn-off, inverter output sensing, etc., or a single controller may be provided for the power system 400 as a whole and configured to provide all generator functions. The control circuitry as disclosed herein may further be supplemented by any additional control circuitry as conventionally implemented for desired operation of the generator set.

The control circuitry may further be connected to a local user interface such as for example a control panel, touch screen display unit, etc., for the purpose of providing displayed outputs or receiving input parameters or commands from one or more users. Wireless remote access and control may further be provided via a remote user interface, for example as may be programmed on or executed from a mobile computing device, and a communications network. Accordingly, operating characteristics for the generator, inverter or the like may be programmed based on input parameters, or automatically determined based for example of sensed load characteristics (e.g., measured current demand). The converter set may in certain embodiments be operable in manual mode, wherein the operator is enabled to review displayed information regarding the inverter output and/or battery charge state and to manually actuate system components, as well as in an automatic mode wherein the controller assumes, among other actions and features, regulation of the power system between generator operation/battery charge and battery discharge to the inverter.

Figure 6:
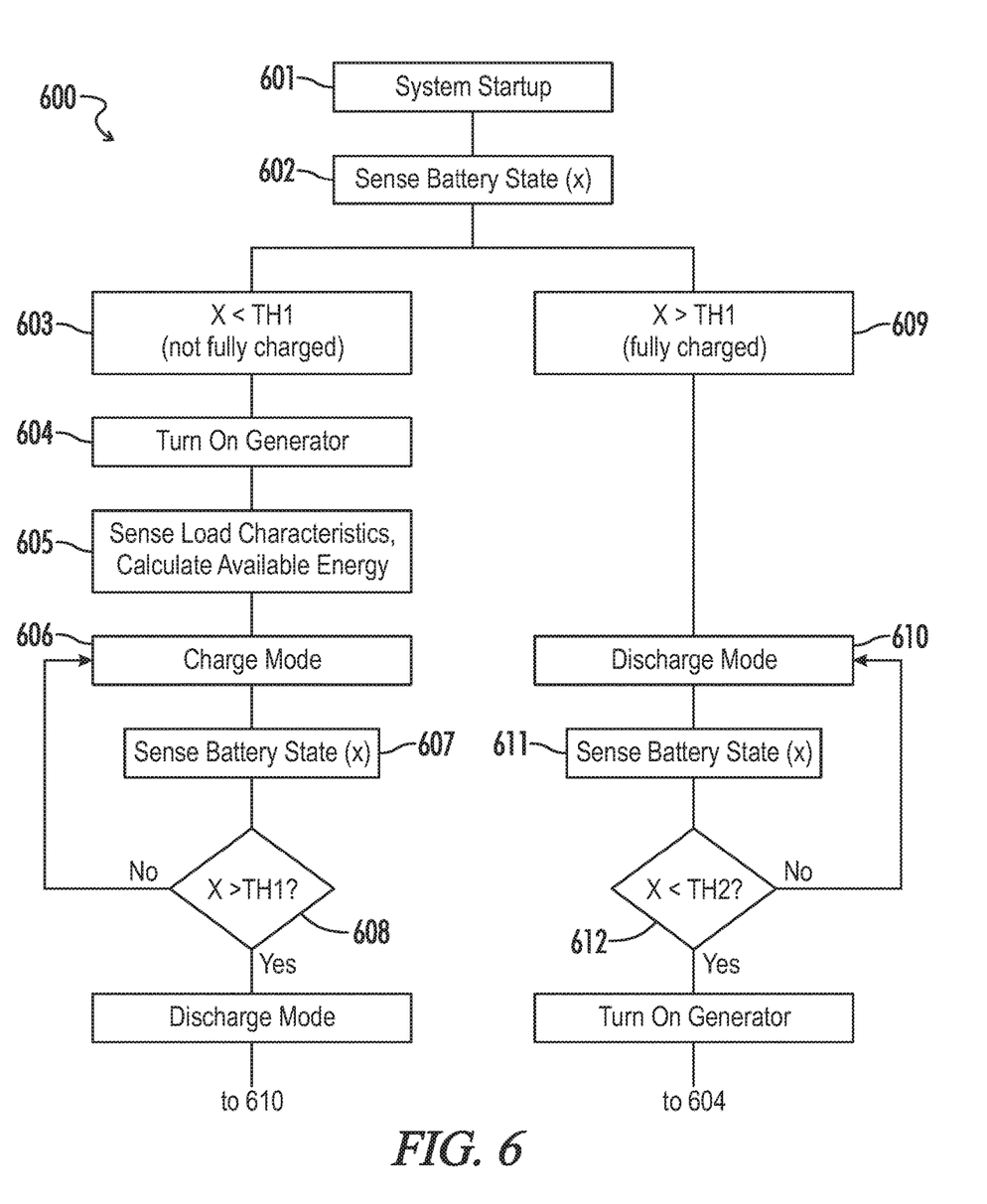
FIG. 6 is a flowchart representing an embodiment of a control and operational method for the hybrid power system of FIG. 4.

Referring next to FIG. 6, an exemplary embodiment of a method 600 may now be described. The method 600 generally relates to an automated process for controlling operation of a hybrid power system as disclosed herein, without specific reference or limitation as to the integrated or modular system architecture, or as to the centralized or distributed control, unless otherwise stated.

Depending on the embodiment, certain steps, events, acts or functions of the method as described herein can be performed in a different sequence, can be added, merged, or left out altogether (e.g., not all described steps, acts or events are necessary for the practice of the method). Moreover, in certain embodiments, steps, acts or events can be performed concurrently rather than sequentially. One of skill in the art may also appreciate that certain steps as described herein may include various sub-steps, associated acts, events or functions having numerous variations or reasonable alternatives.

The method begins with system startup (step 601), which may be initialized manually by an operator or otherwise automatically provided via for example time-based actuation or one or more ambient/environmental triggers. At system startup, the generator set may automatically proceed to the next steps or may further include one or more intermediate steps (not shown) for testing of components to assure proper operation, and/or providing alerts based thereon.

In an embodiment, the method may begin by sensing a current charge state of the energy storage device (step 602) in the external hybrid system branch. In alternative embodiments the generator may simply be turned on upon initial startup or after a preliminary diagnostics stage, wherein the method continues from step 604, below.

Where the current charge state is tested in step 602, and further wherein the charge state (x) is determined 603 to be less than a first threshold charge value TH1 (i.e., not "fully" charged), the method continues wherein the fuel-powered generator is turned on (step 604). In one example, a battery contactor energizes an engine starter, which starts a fuel-powered engine. The engine drives a permanent magnet AC generator, wherein three-phase AC power is provided to a rectifier circuit which further converts the AC input to a high-voltage DC bus. A full-bridge inverter is coupled to the DC bus and converts the high-voltage DC bus input to a split phase 120/240 VAC output to a load.

The method continues in various embodiments by sensing load characteristics (step 605), for example by monitoring output power characteristics and feeding back information to the system control, and regulating operation of the power system based on target output values derived therefrom. The system is optimally regulated to perform at a maximum efficiency rating, wherein it may be determined whether or not surplus energy is available for storing in/charging the energy storage device. Otherwise stated, the method may preferably prioritize efficient operation of the output power stage based for example on the sensed load characteristics and target output settings, such that only surplus energy is implemented for the purpose of charging the energy storage device.

During the charge mode (step 606), energy from the high-voltage DC bus may accordingly be stepped down via one or more DC-DC conversion stages for storage on the energy storage device. In an embodiment, a bus voltage of about 280 VDC may be stepped down to about 28 VDC.

The method continues (step 607) by sensing the charge state for the energy storage device during the charge mode of operation. In the embodiment shown in FIG. 6, as long as the sensed charge state remains below the first threshold (x<TH1), the method remains in the charge mode and the charge state continues to be sensed relative to the threshold value. In some embodiments (not shown), an operator may also be enabled to manually initiate a discharge mode wherein the generator is turned off and the inverter is fed energy discharged from the energy storage device, or such operation may be triggered by one or more programmed events.

Once the charge state of the energy storage device exceeds the first threshold value (i.e., x>TH1), the method proceeds to a discharge operating mode, as further described below with respect to step 610.

Returning briefly to the aforementioned step 602, wherein the charge state of the energy storage device is tested upon initialization of the system, if the charge state is determined to be fully charged (step 609), or otherwise greater than the first threshold (x>TH1), the method proceeds to the discharge mode in step 610. Accordingly, the generator portion of the system is turned off and the energy stored on the energy storage device is discharged to the inverter via the DC bus. The DC-DC conversion stage may be implemented to step up the DC energy stored on the energy storage device (~28 VDC) to the high-voltage DC bus level (~470 VDC), wherein the inverter utilizes the discharged energy for continued DC-AC conversion into output power (split phase 120/240 VAC) to the load.

The method continues during the discharge operating mode (step 612) by sensing the charge state of the energy storage device. As long as the charge state remains above a second threshold value (x>TH2), the energy storage device may be deemed sufficiently charged to maintain discharge operation (i.e., return to step 610). However, once the energy stored on the energy storage device has discharged to the point that the charge is below the second threshold value (x<TH2), the generator may be turned on again, wherein the method proceeds to step 604 and ultimately returns to the charge mode of operation.

In an embodiment, the aforementioned steps may continue to cycle until the power system is turned off (not shown), for example manually or based on programmed triggers as previously noted.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A power system comprising:
    a rectifier configured on an input end to receive three-phase AC power from a fuel-powered generator, and to convert the input AC power to DC power on a DC bus;
    an inverter coupled to the DC bus and configured to generate output AC power to a load;
    a DC-DC power converter coupled on a first end to the DC bus;
    an energy storage device coupled to a second end of the DC-DC power converter and configured to store and discharge energy via the DC-DC power converter and the DC bus; and
    a controller operably connected to one or more sensor inputs associated with the output power to the load and a charge state of the energy storage device, wherein the controller is configured:
        upon determining a first charge state of the energy storage device, to disable the DC power from the rectifier to the DC bus, and to enable discharge of energy stored on the energy storage device to the inverter via the DC bus, and
        upon determining a second charge state of the energy storage device, to reestablish DC power from the rectifier to the DC bus, and to direct energy from the DC bus for energy storage on the energy storage device via the DC-DC power converter,
        wherein the first charge state comprises a stored energy value above a first threshold, and the second charge state comprises a stored energy value below a second threshold.

2. The power system of claim 1, wherein the DC-DC power converter comprises first and second bidirectional and isolated DC-DC power converters coupled on their respective first ends to the DC bus and to each other, and further coupled on their respective second ends across the energy storage device.

3. The power system of claim 2, wherein the energy storage device comprises an electrochemical battery.

4. The power system of claim 2, wherein:
    the inverter comprises a split phase configuration with a first leg comprising first and second switching elements coupled in series and a second leg comprising third and fourth switching elements coupled in series, wherein the load is coupled to a node between the first and second switching elements and to a node between the third and fourth switching elements,
    the first end of the first DC-DC converter comprises a negative terminal coupled to the second and fourth switching elements,
    the first end of the second DC-DC converter comprises a positive terminal coupled to the first and third switching elements, and
    a positive terminal on the first end of the first DC-DC converter and a negative terminal on the first end of the second DC-DC converter are coupled to each other and to a neutral line.

5. The power system of claim 1, wherein the controller is configured to determine a target output power to the load, and to calculate a surplus power available for charging of the energy storage device based at least in part thereon.

6. The power system of claim 1, wherein the controller is configured to disable the DC power from the rectifier to the DC bus by controlling the generator to be turned off.

7. A hybrid power system for integrating with a tactical quiet generator set comprising a first housing within which is disposed a fuel powered generator, an input rectifier and an output inverter for generating output AC power to a load, the hybrid power system comprising:
- a second housing configured to mount proximate to and in operable association with the first housing;
- a DC-DC power converter residing within the second housing and coupled on a first end to a DC bus in the first housing and between the input rectifier and the output inverter;
- an energy storage device coupled to a second end of the DC-DC power converter and configured to store and discharge energy via the DC-DC power converter and the DC bus; and
- a controller configured to:
  - sense a charge state of the energy storage device,
  - upon determining a first charge state of the energy storage device, to disable the DC power from the rectifier to the DC bus, and to enable discharge of energy stored on the energy storage device to the inverter via the DC bus, and
  - upon determining a second charge state of the energy storage device, to reestablish DC power from the rectifier to the DC bus, and to direct energy from the DC bus for energy storage on the energy storage device via the DC-DC power converter,
  - wherein the first charge state comprises a stored energy value above a first threshold, and the second charge state comprises a stored energy value below a second threshold.

8. The hybrid power system of claim 7, wherein the DC-DC power converter comprises first and second bidirectional and isolated DC-DC power converters coupled on their respective first ends to the DC bus and to each other, and further coupled on their respective second ends across the energy storage device.

9. The hybrid power system of claim 8, wherein the energy storage device comprises an electrochemical battery.

10. The hybrid power system of claim 7, wherein the controller is configured to determine a target output power to the load, and to calculate a surplus power available for charging of the energy storage device based at least in part thereon.

11. The hybrid power system of claim 7, wherein the controller is configured to disable the DC power from the rectifier to the DC bus by controlling the generator to be turned off.

12. A method for efficiently producing power to a load from a portable generator set, the generator set comprising a fuel-powered generator, an energy storage device and an output inverter, the method comprising:
- converting input AC power from the fuel-powered generator to DC power on a DC bus coupled to an input side of the inverter;
- regulating the inverter to generate AC power output to the load, based on one or more target load characteristics;
- providing surplus DC power from the DC bus for storage on the energy storage device;
- sensing a charge state of the energy storage device over time;
- upon determining a first charge state of the energy storage device, disabling the fuel-powered generator and enabling discharge of energy stored on the energy storage device to the inverter via the DC bus;
- continuing to sense the charge state of the energy storage device, and upon determining a second charge state of the energy storage device, turning the fuel-powered generator back on and redirecting energy from the DC bus for energy storage on the energy storage device; and
- calculating the surplus power available for charging of the energy storage device based at least on the target load characteristics and a target efficiency rating for the generator.

13. The method of claim 12, the method further comprising stepping down DC power from the DC rail for storage on the energy storage device, and stepping up DC power discharged from the energy storage device and to the inverter.

14. The method of claim 12, wherein the first charge state comprises a stored energy value above a first threshold, and the second charge state comprises a stored energy value below a second threshold.

15. The method of claim 12, wherein the target load characteristics are determined automatically based on a sensed load at an inverter output side.

16. The method of claim 12, further comprising testing upon startup of the portable generator set to sense an initial charge state of the energy storage device, and turning on or leaving off the fuel-powered generator for an initial operating period based on the sensed initial charge state.

17. The method of claim 12, further comprising identifying a fault state associated with discharge of the energy storage device, and accordingly maintaining operation of the fuel-powered generator regardless of a sensed charge state during the fault state.

18. A method for efficiently producing power to a load from a portable generator set, the generator set comprising a fuel-powered generator, an energy storage device and an output inverter, the method comprising:
- converting input AC power from the fuel-powered generator to DC power on a DC bus coupled to an input side of the inverter;
- regulating the inverter to generate AC power output to the load, based on one or more target load characteristics;
- providing surplus DC power from the DC bus for storage on the energy storage device;
- sensing a charge state of the energy storage device over time;
- upon determining a first charge state of the energy storage device, disabling the fuel-powered generator and enabling discharge of energy stored on the energy storage device to the inverter via the DC bus;
- continuing to sense the charge state of the energy storage device, and upon determining a second charge state of the energy storage device, turning the fuel-powered generator back on and redirecting energy from the DC bus for energy storage on the energy storage device,
- wherein the first charge state comprises a stored energy value above a first threshold, and the second charge state comprises a stored energy value below a second threshold.

19. The method of claim 18, the method further comprising stepping down DC power from the DC rail for storage on the energy storage device, and stepping up DC power discharged from the energy storage device and to the inverter.

20. The method of claim 18, further comprising testing upon startup of the portable generator set to sense an initial charge state of the energy storage device, and turning on or leaving off the fuel-powered generator for an initial operating period based on the sensed initial charge state.

\* \* \* \* \*